United States Patent [19]

Heggie

[11] 3,937,087
[45] Feb. 10, 1976

[54] TRANSDUCER FOR ENGINE FUEL INJECTION MONITORING

[75] Inventor: William S. Heggie, Ottawa, Canada

[73] Assignee: Canadian Patents & Development Limited, Ottawa, Canada

[22] Filed: July 5, 1974

[21] Appl. No.: 486,189

[52] U.S. Cl. .......................... 73/398 AR; 73/119 A
[51] Int. Cl.² .................................... G01L 9/04
[58] Field of Search ............ 73/113, 398 AR, 119 A

[56] References Cited
UNITED STATES PATENTS

| | | | |
|---|---|---|---|
| 2,420,148 | 5/1947 | Ostergren | 73/398 AR |
| 2,544,567 | 3/1951 | Rundell | 73/398 AR |
| 2,747,408 | 5/1956 | Boytiem et al. | 73/398 AR |

Primary Examiner—Herbert Goldstein
Assistant Examiner—Anthony V. Ciarlante
Attorney, Agent, or Firm—James R. Hughes

[57] ABSTRACT

A transducer for diesel fuel injection for monitoring which has a strain detector mounted on the circumference of the fuel line tube such that expansion and contraction of the tube cause variations of the output of the detector, a plastic sleeve covering the resistance element at least in some part, a torpedo-shaped housing made of strong metal encompassing the tube and the resistance element mounted thereon and rigidly attached to the tube circumferentially at outer positions away from the resistance element, the housing defining an annular space between the housing and the tube and containing the resistance element and the sleeve, a strong adhesive material filling the said space, and electrical leads from the resistance element passing to the exterior through openings in the housing.

5 Claims, 6 Drawing Figures

TRANSDUCER FOR ENGINE FUEL INJECTION MONITORING

This invention relates to a transducer for diesel fuel injection monitoring and more particularly to means for mounting a resistance type strain gauge transducer on a thick walled fuel injection line such that high resolution pressure time histories of the fuel injection cycle may be obtained.

Diesel fuel injection system malfunctions are responsible directly and indirectly for possibly more engine problems than any other single system or device, ranging from poor efficiency to major engine damage. A considerable amount of work has been done by others on the analysis of diesel injection phenomenon via the pressure signature. This has been limited to laboratory conditions and clinical type transportable equipment which undesirably requires breaking into and modifying the system to accomodate transducers which require direct communion with the fluid. The following paper deals with the current state of the art of diagnosis using the fuel injection pressure time history: An Electronic Analyser for Diesel Engines, by R. German et al., SAE, Paper No. 690,474, May 1969.

Systems that require breaking into the fuel line and direct contact with the fuel are not attractive for the following reasons. (a) The extremely precise nature of a diesel fuel injection system and its sensitivity to system inertia, volume, and length of the fluid sonic path make it undesirable to use sensing devices directly with the fluid. (b) A good dynamic crystal transducer installation which is at present commerically available is very expensive with the cost being too prohibitive to apply to an engine on a full time, all cylinder basis. (e) The life of present types of transducers is less than acceptable.

It is an object of the present invention to provide a transducer for obtaining a pressure time history of the diesel fuel injection cycle that does not require the opening of a fuel line or close contact of the transducer element with the fluid flow in the line.

This and other objects of the invention are achieved by a transducer comprising at least one resistance element strain gauge fixedly mounted longitudinally around the circumference of a fuel line tube such that expansion and contraction of the tube cause variations of the resistance of the resistance element, a plastic sleeve covering the resistance element at least in some part, a torpedo-shaped housing made of strong metal encompassing the tube and the resistance element mounted thereon and fixedly attached to the tube circumferentially at outer positions away from the resistance element, the housing defining an annular space between the housing and the tube, a strong setting adhesive filling the space, and electrical leads from the resistance element to the exterior through openings in the housing.

In drawings which illustrate embodiments of the invention,

Figure 1:
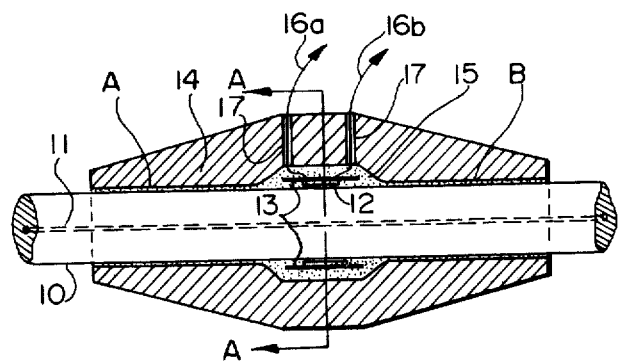
FIG. 1 is a longitudinal cross-section of a transducer mounted on a fuel line.
Figures 2, 3:
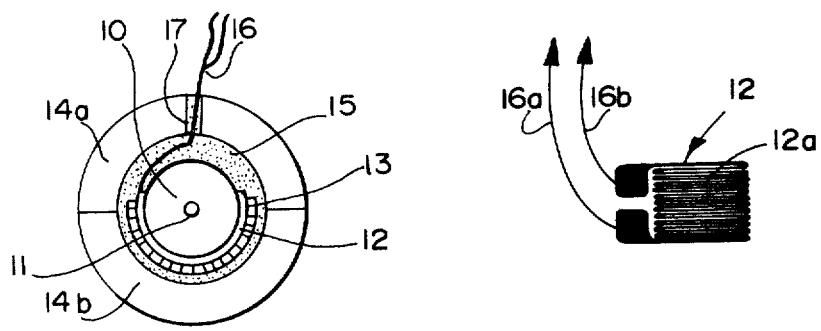
FIG. 2 is a transverse cross-section on A—A of FIG. 1.
FIG. 3 shows the resistance element.
Figure 4:
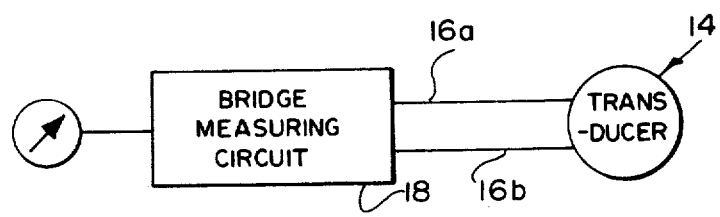
FIG. 4 shows the transducer and measuring circuitry.

Referring to FIGS. 1 and 2, a standard thick tube fuel line 10 having a fine central bore 11, has mounted on it a resistance element 12. This element is rigidly fixed to the tube ny epoxy resin glue with the longitudinal sensing portions of the element (see 12a of FIG. 3) being wrapped around the tube circumferentially. A sheet of vinyl plastic 13 is wrapped over the resistance element to provide protection, damping and a yielding layer to expand into. A torpedo-shaped housing 14 made preferably of steel encompasses the tube and is rigidly fixed to the tube at areas A and B by epoxy resin glue. The housing is split as shown in FIG. 2 (14a and 14b) to allow application to the tube. The two halves are also rigidly joined by epoxy resin glue. The housing defines an annular inner space 15 which is completely filled with epoxy. Electrical leads 16a and 16b from the resistance element 12 pass to the exterior through passages 17 provided in the housing 14 and are connected to suitable resistance measuring circuitry 18 e.g. a bridge (see FIG. 4).

Figure 5A:
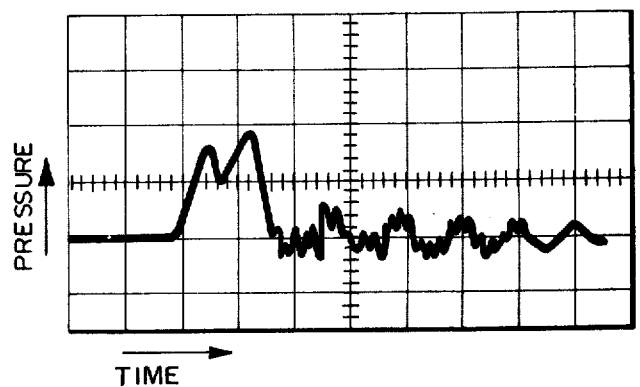
FIG. 5A and 5B show traces in graph form pressure signatures taken by the transducer of the invention and by a standard crystal type transducer.
Figure 5B:
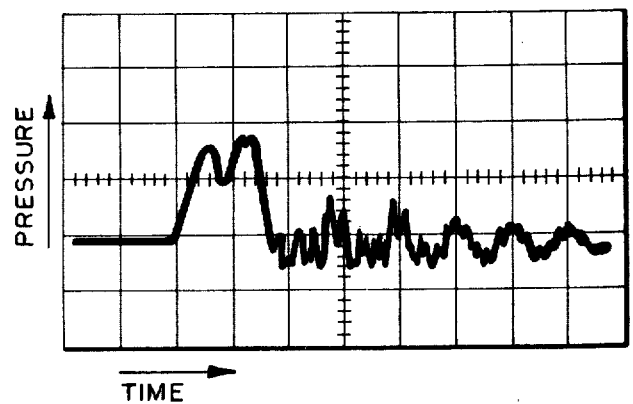

FIGS. 5A and 5B are graphs of oscilloscope traces of a pressure signature of a diesel engine cycle with 5A being the trace using the transducer of the present invention and 5B the trace obtained using a commercially available crystal type transducer. It will be seen that the device of the present invention gives a reading as good and possible preferable to htat of the crystal type.

In operation the steel housing firmly holds the tube at the outer positions and only local hoop stress is measured in the inner region. All other stresses that might affect the pressure reading are eliminated or greatly minimized.

The present device is inexpensive and easy to apply. It lends itself admirably to installation on a permanent basis on all or many of the fuel injection lines of diesel engines of all types, in power plants, locomotives, etc.

I claim:

1. A fuel injection pressure monitoring transducer for mounting on the fuel injection lines of diesel engines comprising at least one strain detector mounted on the circumference of the fuel line tube such that expansion and contraction of the tube cause variations of the output of the detector, a plastic sleeve covering the resistance element at least in some part, a torpedo-shaped housing made of strong metal encompassing the tube and the resistance element mounted thereon and rigidly attached to the tube circumferentially at outer positions away from the resistance element, the housing defining an annular space between the housing and the tube and containing the resistance element and the sleeve, a strong adhesive material filing the said space, and electrical leads from the resistance element passing to the exterior through openings in the housing.

2. A transducer as in claim 1 wherein the strain detector is a resistance element strain gauge mounted longitudinally around the circumference of the fuel line.

3. A transducer as in claim 1 wherein the housing is made of steel and is formed as split halves that are mounted around the tube and then fixed together with a strong adhesive material.

4. A transducer as in claim 1 wherein the strong adhesive material is an epoxy resin glue.

5. A transducer as in claim 3 wherein the strong adhesive material used to fix the two halves is an epoxy resin glue.

* * * * *